INVENTOR
GALT B. BOOTH
BY
Byerly, Townsend, Watson & Churchill
ATTORNEYS.

United States Patent Office 3,422,293
Patented Jan. 14, 1969

3,422,293
MOVING COIL ELECTRODYNAMIC EXCITER
WITH COOLING MEANS
Galt B. Booth, Branford, Conn., assignor to Textron
Electronics, Inc., Providence, R.I., a corporation of
Delaware
Filed May 28, 1965, Ser. No. 459,569
U.S. Cl. 310—16　　2 Claims
Int. Cl. H02k 9/00; H02k 33/00; H02k 35/00

ABSTRACT OF THE DISCLOSURE

A single shorted turn armature is mounted for movement within an annular gap in a laminated double-ended iron core structure having field windings for establishing a unidirectional magnetic field across the gap. Stationary primary windings concentric with the armature induce driving current in the armature through transformer action. The shorted turn is in the form of a metal cylinder at the end of a cruciform or spider-like supporting structure. The same basic principle is applied to a flat sheet armature where the shorted turn lies in the plane of the sheet and the primary windings are located parallel thereto, all within a straight air gap.

---

The present invention relates to an electrodynamic exciter or shaker for imparting vibratory motion to a test specimen.

Today, industry is making more and more use of equipment for synthesizing the environment under which a particular product is intended to function. The subject is referred to as environmental testing. Such testing is obviously necessary to determine, in advance of subjecting the product to the actual conditions, whether the product will be able to stand up and perform satisfactorily when in use. This facility has been especially important in the space program.

With the design of larger and more powerful rockets, for example, there has developed a need for more powerful test equipment. An exciter with larger maximum force output and increased acceleration capability is needed greatly. An object of the present invention is to satisfy that need.

In electrodynamic exciters currently in use an armature consisting of a table structure and an interconnected driving coil is driven by interaction between current flowing in the coil and a unidirectional magnetic field supplied by a stator. For proper operation the coil and table must move as a unit. If the connection between the coil and table should give or yield it will interfere with and alter the shaker output. This problem has given rise to numerous arrangements for securing or attaching the coil to the table. Unfortunately, all such arrangements occupy space in the flux gap and cut down the efficiency of the unit.

In accordance with the present invention this problem is eliminated by removing the driving coil as such from the armature and rendering it stationary. The invention in essence is based upon the idea of providing the armature with a closed loop path of conductive material and inducing the driving current into such loop path by magnetic induction. In this manner the armature can be constructed as an integral unit achieving optimum union between the current carrying portion of the armature and the table proper.

More specifically, in accordance with the invention there is provided an electrodynamic exciter comprising a stator field structure having at least two ferrous pole members with a gap therebetween, means for establishing a unidirectional magnetic field between the pole members across the gap, an armature supported for movement relative to the field structure and having a closed loop of electrically conductive material, at least a portion of the closed loop of material being disposed at all times in the gap where interaction between the magnetic field and electric current flowing in the loop of material will impart movement to the armature, a stationary winding inductively coupled thereto for inducing an alternating electric current in the loop of material, and means for coupling the stationary winding to a source of alternating signal current.

The invention will be better understood after reading the following detailed description thereof with reference to the appended drawings in which.

Reference now should be had to the drawings and particularly to FIGURES 1 to 4.

The stator field structure of the exciter is composed of an inner pole member 30, an outer pole member 31, two identical spacers 32, and two identical end plates 33. Each of these components is shown in greater detail in FIGURES 8 to 15. The working gap between the pole members 30 and 31 is shown at 34.

An upper field coil 35 and a lower field coil 36 is provided for establishing, when energized through connectors 37 and 38 with direct current, a unidirectional magnetic field between pole members 30 and 31 across gap 34.

Figure 5:
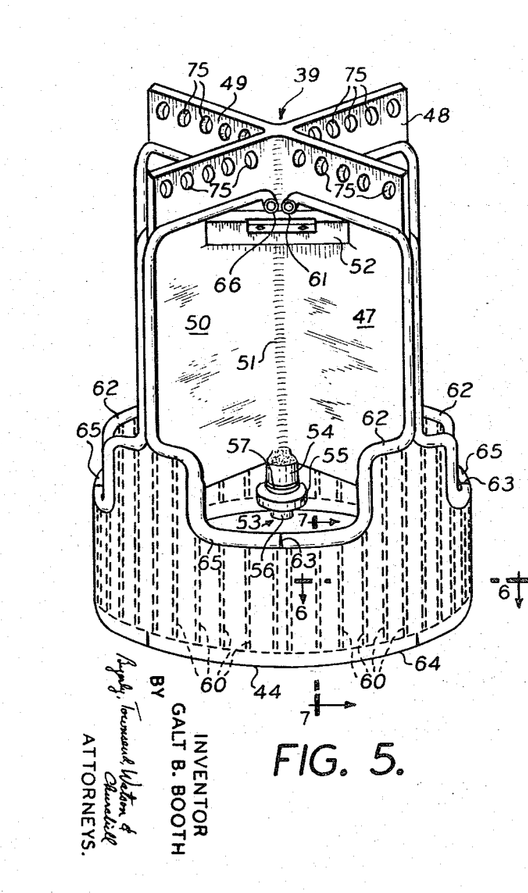
FIGURE 5 is a perspective view of the armature employed in the exciter of FIGURE 1.

The armature 39 (shown in detail in FIGURE 5) is supported by strap springs 40, 41, 42 and 43 for movement relative to the field structure. This armature as is best seen in FIGURE 5 is formed with a cylindrical bottom section 44. Being made of aluminum or other strong but light weight electrically conductive material the section 44 provides a closed loop path for electric current. The portion 44 of the armature is disposed in the gap 34 where interaction between the magnetic field and electric current flowing in the loop 44 will impart in known manner movement to the armature.

A stationary winding is also disposed in the gap 34 with its two coil parts 45 and 46 mounted concentrically respectively adjacent the pole faces of the inner and outer pole members 30, 31 with the closed loop of material 44 located between them.

Figure 2:
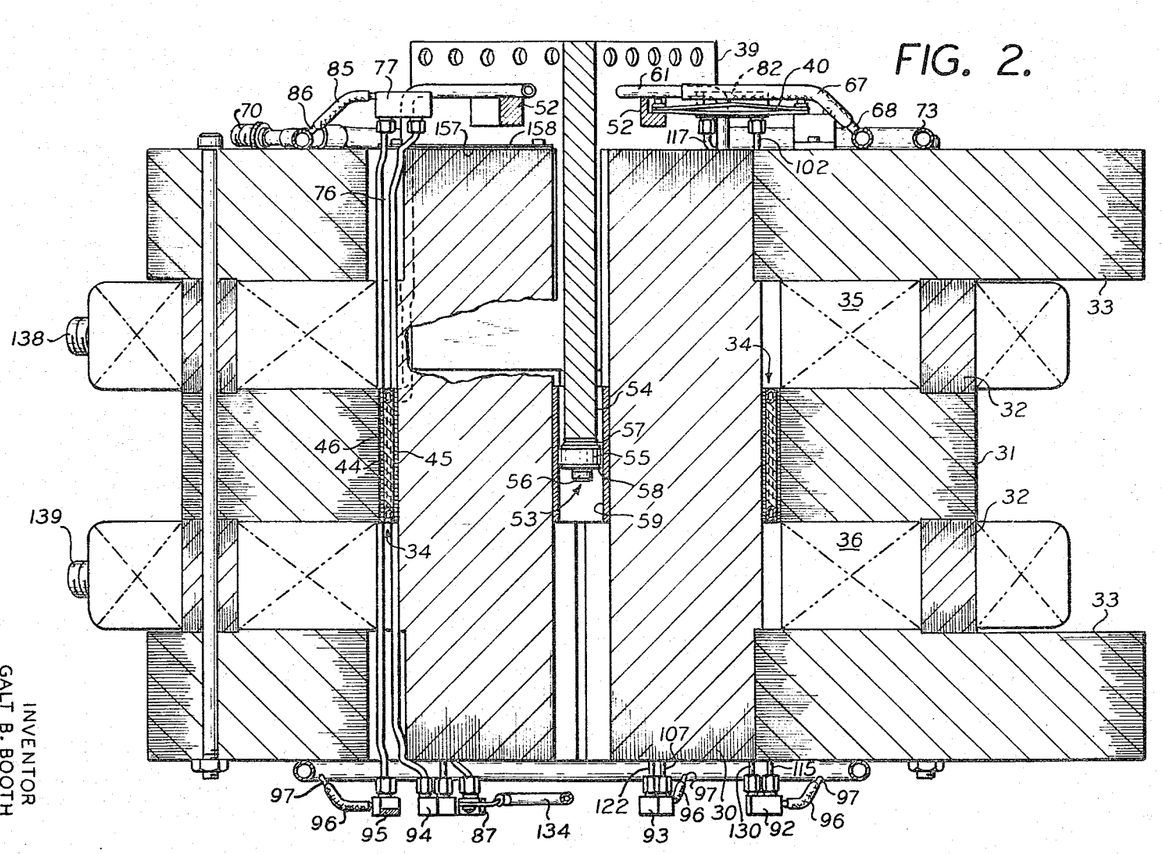
FIGURE 2 is a vertical sectional view taken along the line 2—2 in FIGURE 1.
Figure 3:
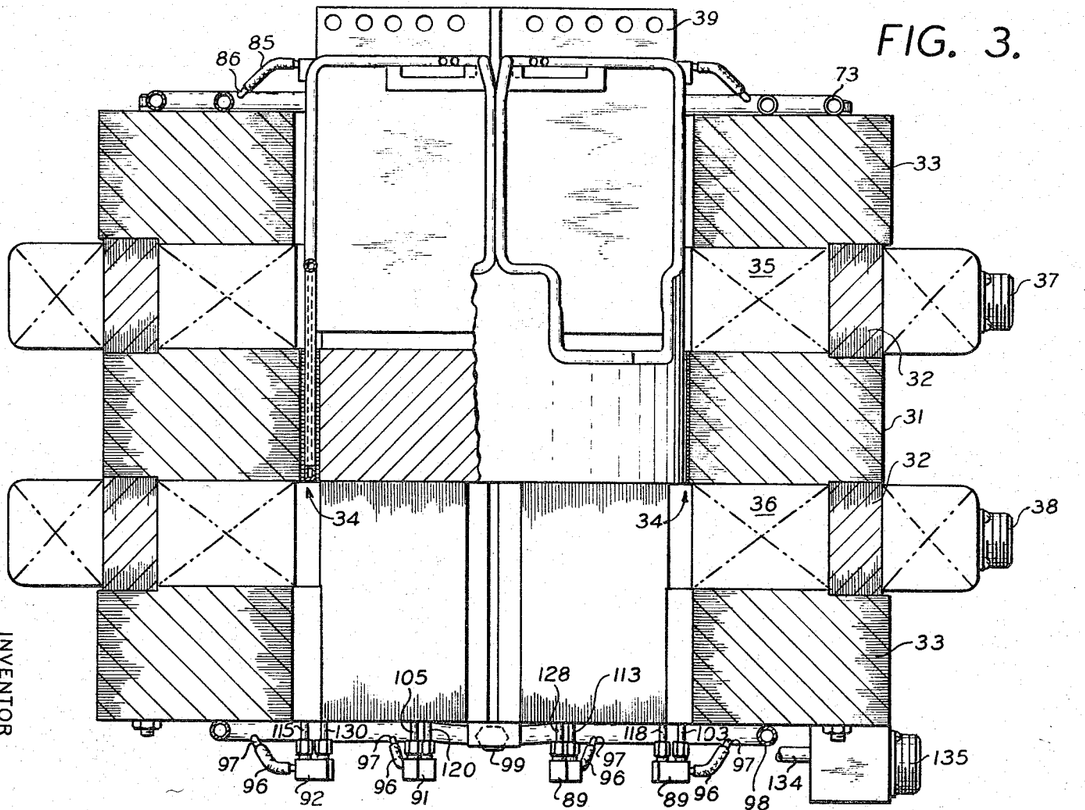
FIGURE 3 is a vertical sectional view taken along the line 3—3 in FIGURE 1.

As best seen in FIGURES 2 and 5 the armature 39 is provided with a spider-like supporting structure consisting of flat plates 47, 48, 49 and 50 joined along one vertical edge by welding or the like so as to radiate at 90° intervals from the central axis 51. The cylindrical bottom section 44 may be formed separately and joined near its upper end as viewed in the drawings to the lower end of the supporting structure. Again, the joint can be obtained by welding.

Cross bars 52 are provided near the top of the supporting structure for receiving the strap springs 40 to 43. These springs support the static load of the armature and center and guide the upper portion thereof in its movement. The lower end of the armature is guided in its movement relative to the field structure by means of a piston 53 located at the end of a rod extension 54. The piston 53 consists of a ring 55 of filled plastic, e.g., nylon or "Teflon," mounted on a bolt 56 threaded into the end of extension 54. The ring 55 is sandwiched between loading dished springs 57 and a thrust washer 58.

The guide piston 53 of the armature rides in a bushing 59 located at the center of the inner pole member 30. Loading of the plastic ring by the springs 57 will tend to cause it to expand so as to compensate for wear in use.

A characteristic of all electrodynamic machinery is that heat is generated by the electric currents flowing through the various parts therof. In small size units the generated heat is usually transferred to the surrounding media at an adequate rate by the quiescent phenomena of radiation, conduction and convection. However, in larger units, or even in smaller units operating in confined space, it is necessary to employ forced cooling techniques.

The section 44 of armature 39 carries extremely large currents in operation. To carry off the heat this section is provided with a plurality of passages 60 through which coolant can be circulated.

Figures 4, 6, 7:
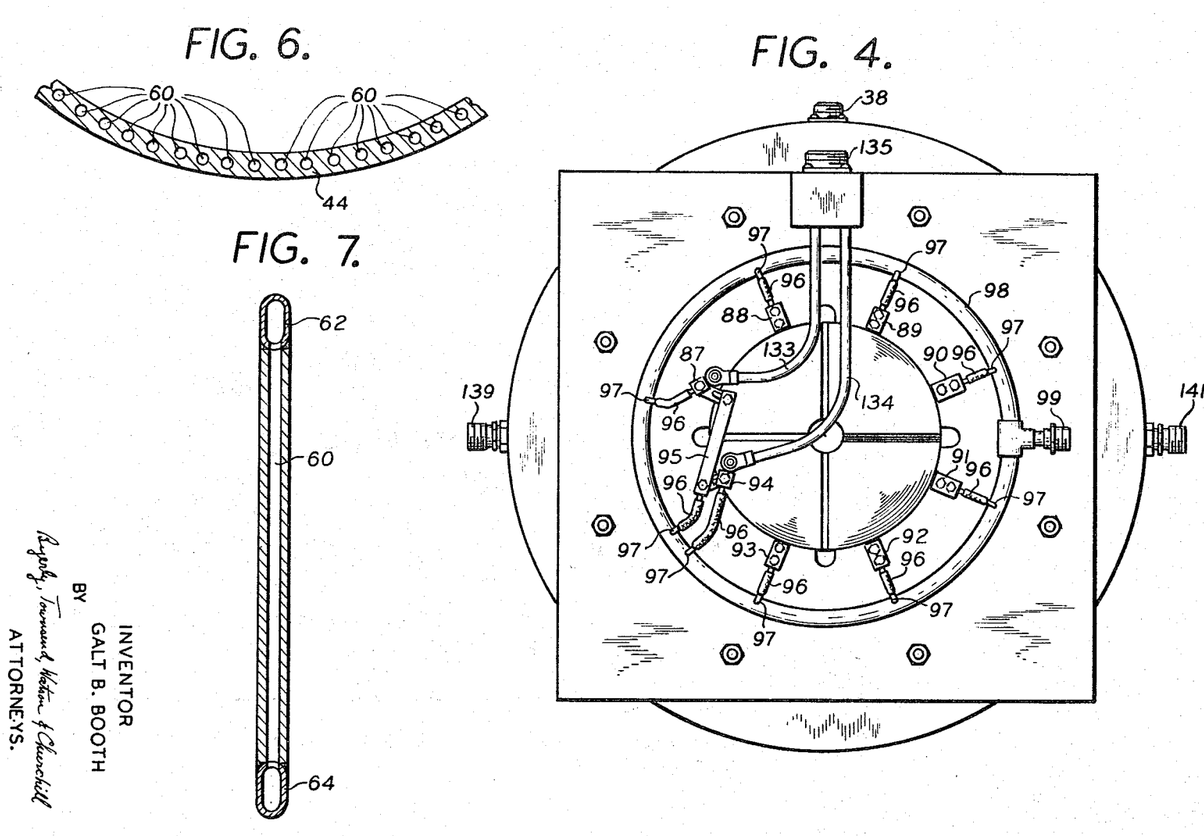
FIGURE 4 is a bottom plan view of the exciter of FIGURE 1.
FIGURE 6 is a fragmentary sectional view taken along the line 6—6 in FIGURE 5.
FIGURE 7 is a fragmentary sectional view taken along the line 7—7 in FIGURE 5.

Referring to FIGURES 5, 6 and 7, the construction of one quarter segment of the armature will be described. The remaining three segments are identical and need not be described separately although the same reference numerals will be applied to identical parts.

Coolant is supplied to each segment of the armature via inlet pipe 61. From pipe 61 it is conveyed to a distribution header 62 which dead ends at the point 63. Header 62 communicates with the upper ends of passages 60 which intersect with it. The lower ends of these passages 60 communicate with a bottom header 64 which extends throughout the entire length of the quarter segment so as to communicate with the lower ends of the remaining passages 60 in the segment. The path of the coolant is then upward into a header 65 which leads into outlet pipe 66.

Figure 1:
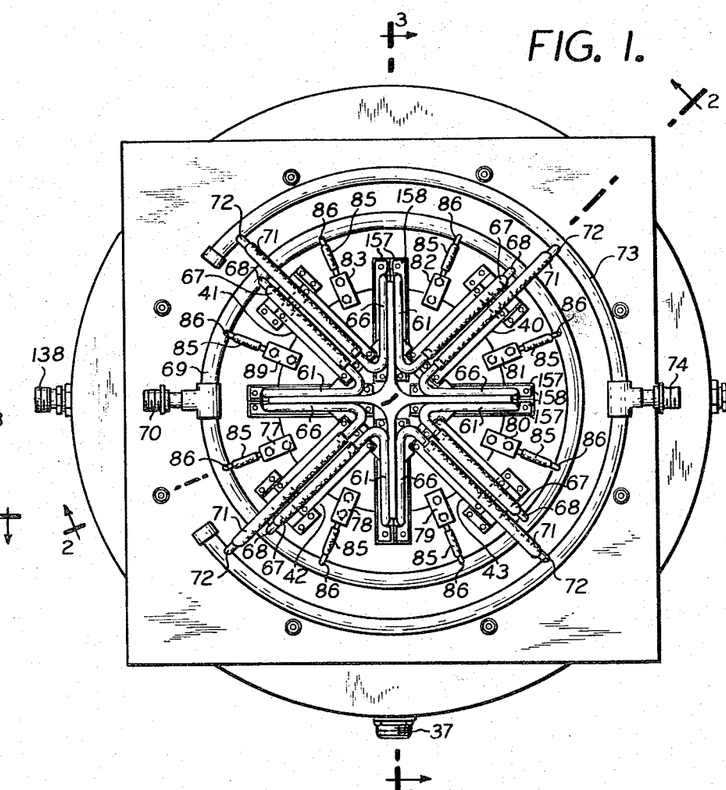
FIGURE 1 is a top plan view of an electrodynamic exciter embodying the present invention.

Referring to FIGURE 1, it will be seen that the inlet pipes 61 are joined by flexible tubing 67 to stubs 68 on a supply manifold 69 which is provided with a coolant supply fitting or connection 70. The outlet pipes 66 are joined by flexible tubing 71 to stubs 72 on an outlet manifold 73 having a connecting fitting 74.

In order to secure the specimen to the armature the upper ends of the web plates 47 to 50 are provided with a series of bolt holes or apertures 75, as shown.

The driving coils 45 and 46 can also be cooled to advantage. As will be explained at a later point in the description the driving coils are formed by winding a plurality of hollow conductors. One end of each conductor is located at the top of the coil while the other end is located at the bottom of the coil. The upper ends of the conductors are brought up in the space between the inner pole member 30 and the field coil 35 and through slots 76 formed in the plate 33 to small manifolds 77, 78, 79, 80, 81, 82, 83 and 84. Each of the manifolds 77 to 84 is connected through a separate length of flexible tubing 85 to a separate stub 86 on supply manifold 69. The lower ends of the conductors making up the driving coils are brought down in similar manner to the manifolds 87, 88, 89, 90, 91, 92, 93, 94 and 95 best seen in FIGURE 4. Manifolds 87 to 95 are each connected by a separate length of flexible tubing 96 to a separate stub 97 on a return or outlet manifold 98, the latter being provided with a coupling fitting 99.

At this point it should be noted that all of the lengths of flexible tubing referred to above must be made of material which qualifies as a good electrical insulator.

Referring to FIGURES 16 to 19 the ends of the individual conductors making up the driving coils 45 and 46 are numbered from 101 to 132, inclusive. From FIGURE 19 it is possible to determine the respective ends of any selected conductor. Thus, ends 101 and 102 are associated with the same conductor which will be found in the outer coil 46 with end 101 at the bottom (see FIGURE 18) and 102 at the top (see FIGURE 16). It will be observed from FIGURE 17 that coil 45 is wound as a right-hand thread while coil 46 is of the opposite hand. However, it is arbitrary which is right and which is left so long as the inner coil and outer coil are wound in opposite directions. Each conductor extends for 2⅜ turns.

Figure 19:
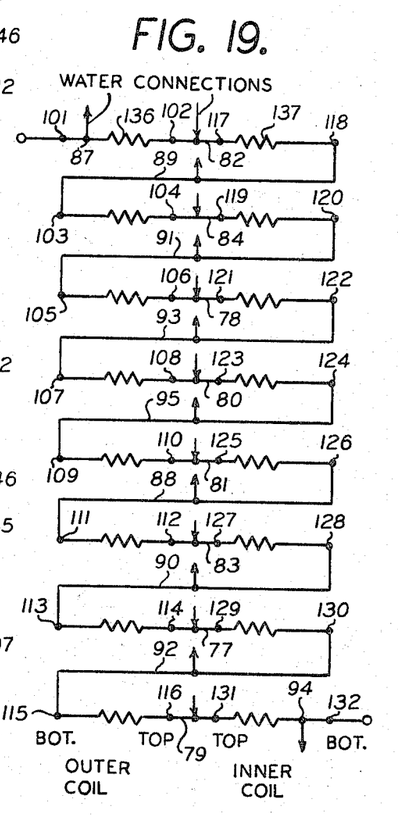
FIGURE 19 is a schematic diagram showing both the coolant and electrical circuits for the driving coils of FIGURE 16.

FIGURE 19 shows, for example, that conductor ends 102 and 117 are connected together electrically. This connection is actually achieved by means of the manifold 82 made of electrically conductive material and to which the respective conductor ends are joined. In like manner the various small manifolds make electrical connection with and between the ends of the conductors to which they are joined.

Referring to FIGURE 4 it will be observed that manifolds 87 and 94 are connected each to only one conductor end. These manifolds 87 and 94 function as the electrical end terminals for the driving coils. Electrical conductors or leads 133 and 134 join manifolds 87 and 94 to an electrical connector 135.

From FIGURE 19 it can be seen that all of the conductors are connected together electrically to form one continuous series circuit between the end terminals. Also from this figure it is possible to observe the flow path of the coolant. For example, it enters conductors 136 and 137 via manifold 82 and leaves conductor 136 via manifold 87 while it exits from conductor 137 via manifold 89. The other flow paths should now be readily apparent.

The interconnection of the component conductors and the particular winding directions are such that the two coils function in flux aiding relationship to produce a magnetic field. The coils are bonded by an epoxy cement or the like to the respective pole member 30 or 31. When an alternating current voltage is applied through the leads 133 and 134 to the driving coils or stationary winding an alternating flux is generated which flows through a closed low reluctance path. This path may be traced from the inner pole member 30 through the top plate 33, upper spacer 32, outer pole member 31, lower spacer 32 and bottom plate 33 back to the inner pole 30. Substantially perfect symmetry between the upper and lower flux paths is obtained by making the upper and lower iron parts identical.

It will be understood that substantially all of the flux generated by coils 45 and 46 will link the conductive loop section 44 of the armature. In known maner an alternating current will be induced to flow in section 44.

Figures 10, 11:
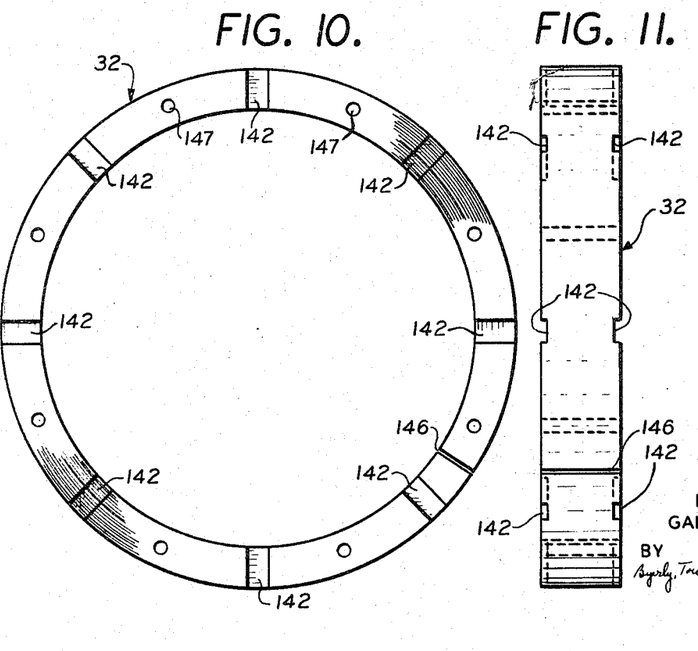
FIGURES 10 and 11 are plan and elevational views, respectively, of the spacer members in the exciter of FIGURE 1.
Figures 12, 13:
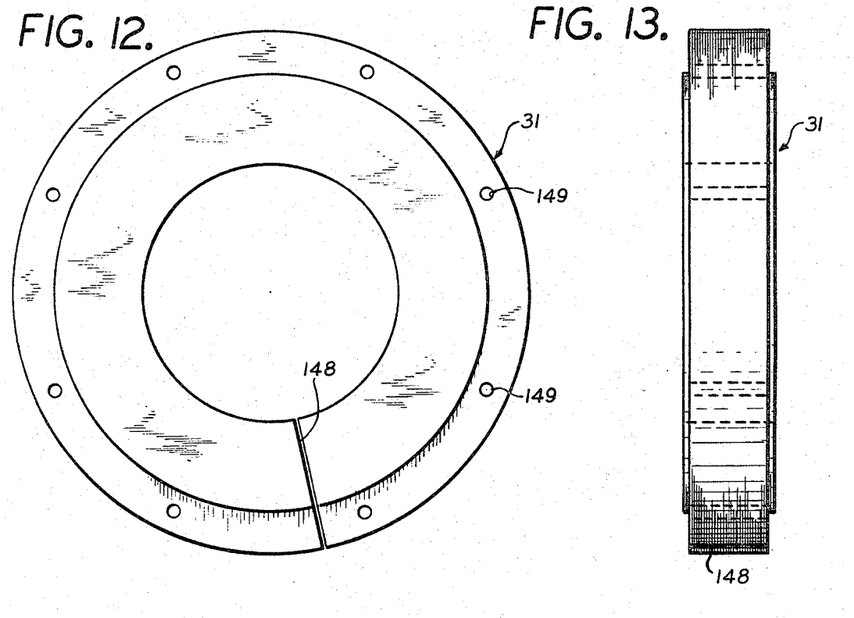
FIGURES 12 and 13 are plan and elevational views, respectively, of the outer pole member of the exciter of FIGURE 1.

The field coils 35 and 36 are wound horizontally as viewed in FIGURE 2 and arranged to be supplied with direct current voltage through the connectors 37 and 38, respectively. These coils are also formed from hollow conductors and are cooled by circulating coolant therethrough. Connectors 138 and 139 represent inlets for coolant while connectors 140 and 141 are the return fittings. All of the windings are confined within the spacers 32 and potted in an epoxy resin or the like. The electrical and coolant connections are located externally of the spacers and likewise encased in a potting composition. As best seen in FIGURES 10 and 11 the spacers are provided with slots 142 through which the various connections pass to the field coils.

When the coils are energized a unidirectional magnetic field is established across the gap 34. Again, a low reluctance flux path is provided for the flux return around both ends of the gap.

In well known manner the alternating current induced in the armature section 44 will interact with the unidirectional field in the gap to impart movement to the armature.

In order to obtain maximum efficiency for the generation of voltage in the closed loop path 44 it is necessary to minimize as much as possible the eddy current losses that might be reflected back into the driving winding. To do this all of the stator field structure lying in the alternating current flux path inductively linking the stationary winding 45, 46 to the loop of material 44 is laminated. In addition, the various laminations are slit in order to break up any otherwise closed paths.

Figure 8:
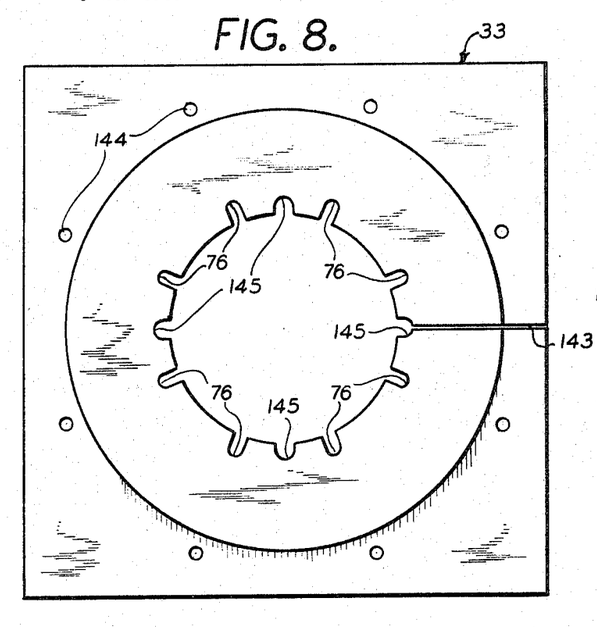
FIGURES 8 and 9 are plan and elevational views, respectively, of the top and bottom plates of the exciter of FIGURE 1.
Figure 9:
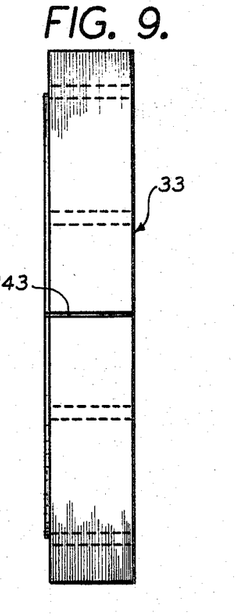

Thus, as shown in FIGURES 8 and 9, the plates 33 are composed of a stack of flat laminations which are slit at 143. Bolt apertures 144 are provided for assembling the parts of the stator structure. Slots 145 are provided to accommodate the tips of the armature webs and the coolant pipes associated therewith.

As shown in FIGURES 10 and 11 the spacers may be formed by tightly winding a ribbon of suitable ferrous material. An epoxy cement can be applied during winding for bonding. To ensure against a closed loop path the resultant ring is slit through at 146. Bolt holes 147 are provided as illustrated.

Flat plate laminations are again used for the outer pole member 31 which is slit at 148. See FIGURES 12 and 13. Apertures 149 are for the tie bolts.

Figure 14:
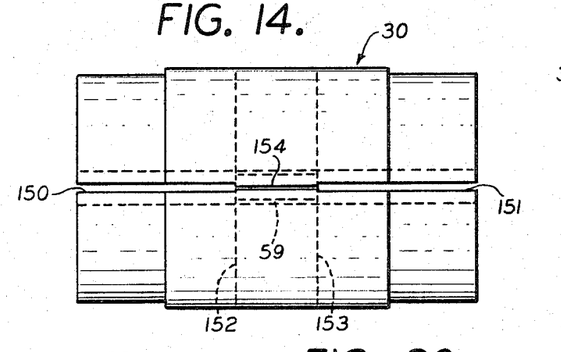
FIGURES 14 and 15 are elevational and plan views, respectively, of the inner pole member of the exciter of FIGURE 1.
Figure 15:
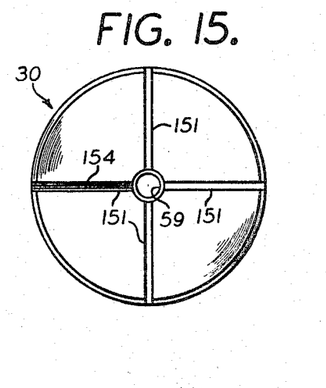
Figure 16:
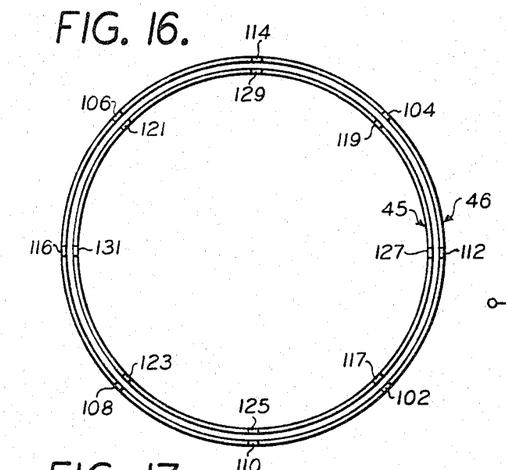
FIGURE 16 is a top plan view of the driving coils of the exciter of FIGURE 1.
Figure 17:
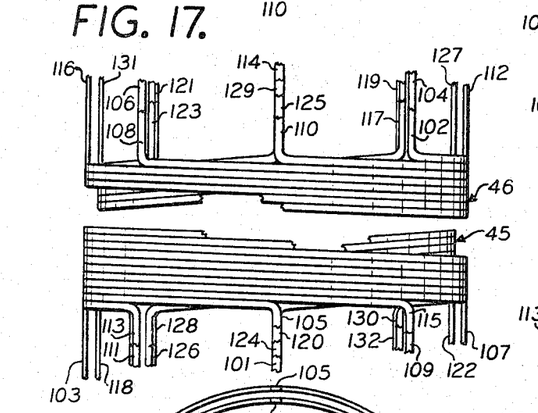
FIGURE 17 is an elevational view of the coils shown in FIGURE 16.
Figure 18:
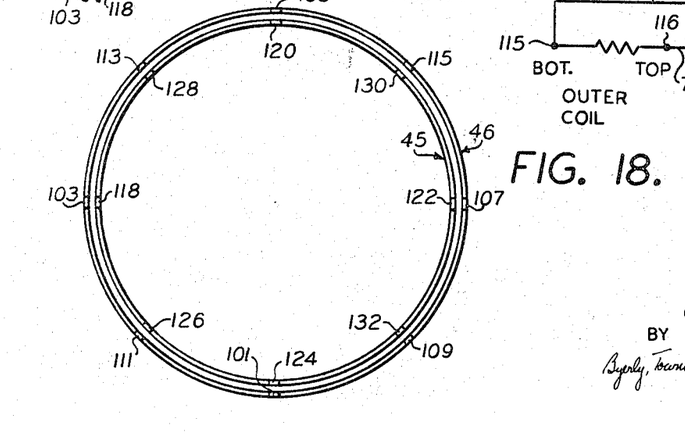
FIGURE 18 is a bottom plan view of the coils shown in FIGURE 16.

The inner pole 30 shown in detail in FIGURES 14 and 15 is produced by winding tightly a ribbon of ferrous material about a suitable mandrel with the bushing 59 in place. Epoxy cement is applied during winding for bonding. Next the crossed slots 150 and 151 are provided at opposite ends terminating at the points indicated by the dashed lines 152 and 153, respectively. The slots 150 may accommodate the webs of the armature while the slots 151 are introduced to maintain magnetic symmetry. A narrow radial slit 154 is introduced into the central section to ensure interruption of all circular paths.

Figure 20:
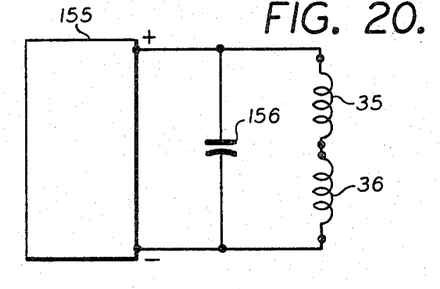
FIGURE 20 is a schematic diagram showing the connection of the field coils of the exciter of FIGURE 1.

FIGURE 20 shows schematically the manner in which the field coils 35 and 36 are connected to the direct current source 155. If there should be any lack of symmetry between the upper and lower magnetic paths, unequal alternating current voltages will be induced in the respective field coils. In order to reduce this imbalance and at the same time prevent alternating current from flowing through the source 155, the field coils are shunted by a capacitor 156.

While not essential for operation of the exciter it is nevertheless desirable to prevent the ready introduction into the gap 34 of dust and foreign particles. This is best accomplished by inclusion of felt strips 157 secured in place by metal plates 158. See FIGURES 1 and 3.

It should be apparent from FIGURE 2 that the piston 55 can be replaced when necessary by access through the axial passage in the inner pole member 30.

A careful study of the arrangement of the stator iron in the embodiment described above will reveal an optimum arrangement for the production of both the A.C. and D.C. flux. It will be found that this construction provides a very efficient and powerful exciter having an extremely broad frequency response.

Figure 21:
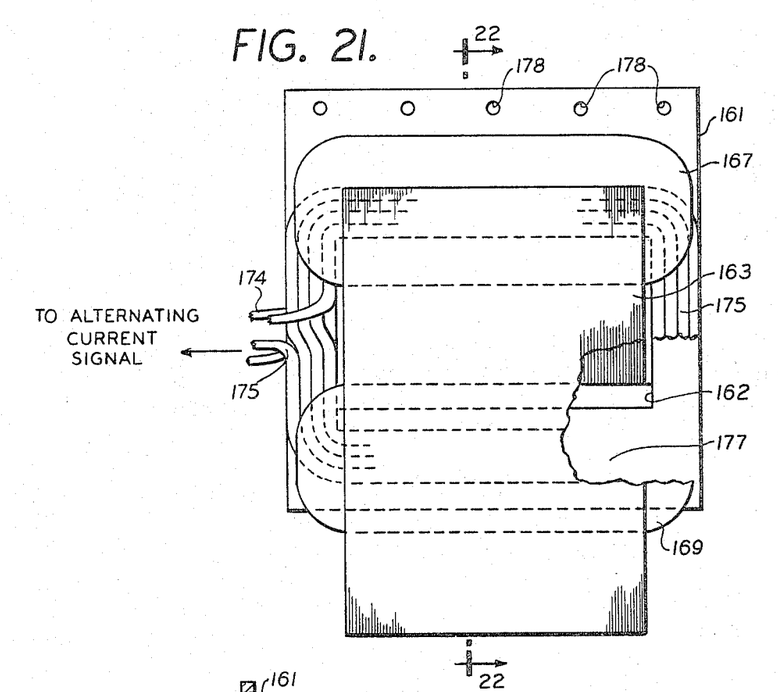
FIGURE 21 is an elevational view of another embodiment of the invention, the illustration being of simplified form.
Figure 22:
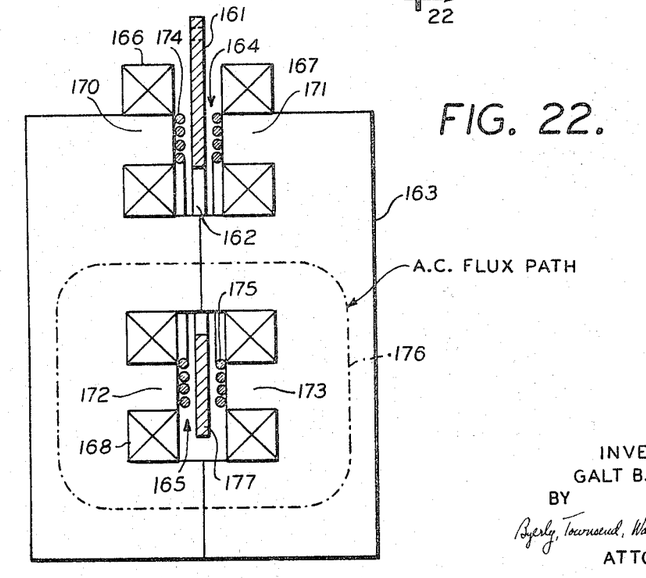
FIGURE 22 is a vertical sectional view taken along line 22—22 of FIGURE 21.

The basic concept underlying the present invention lends itself to the construction of a radically different form of exciter than the concentric cylindrical version described with reference to FIGURES 1 to 20. In FIGURES 21 and 22 there is illustrated a flat plate unit ideally suited to small force requirements.

The armature 161 is in the form of a flat plate of electrically conductive material provided with a window or aperture 162. The material surrounding the aperture 162 functions as a closed loop path for electrical current.

A multiplicity of ferrous laminations, all identical, are stacked and joined to provide the stator field structure 163. The structure is provided with an upper flux gap 164 and a lower flux gap 165, both of which extend across the entire width of the field structure. Field coils 166, 167, 168 and 169 are disposed on the poles 170, 171, 172 and 173, as shown. The winding and arrangement for energizing the field coils is such that a unidirectional field is developed across gaps 164 and 165 with poles 170 and 173 of one and the same magnetic polarity and poles 171 and 172 of opposite polarity.

The driving winding is again formed in two parts, flat coils 174 and 175. The winding and arrangement of means for energizing coils 174 and 175 is such that they are in flux aiding relationship and generate a field whose principal path is shown by the dot-dash line 176. This field links the horizontal portion 177 as viewed in FIGURE 21 of armature 161 and induces a current therein in known manner. This current interacts with the unidirectional fields in both gaps for imparting movement to the armature.

Armature 161 is provided at its upper end with apertures 178 for enabling a specimen to be secured thereto. While not shown, it will be understood that means are provided for guiding the movement of the armature and for supporting its static load.

In both embodiments of the invention described herein it is desired to reduce the eddy current losses to a minimum. It has been mentioned in connection with the description of the manner of forming the inner pole member 30 and the spacers 32 that the metallic ribbon is coated with an epoxy cement for bonding purposes. Additionally, the resin serves as an electric insulator between adjacent turns of the laminated structure. It is preferred to insulate similarly the flat plate laminations as well. However, the radial slits have been found necessary even in the spiral wound members as insurance against any imperfections or punctures in the insulating coating.

While from the standpoint of obtaining an output with good wave shape it is desirable to arrange for substantial symmetry in the core iron, it may be preferable under certain conditions to depart slightly from this condition. For example, if one or more of the otherwise unused slots in the bottom of the center pole member 30 and/or the notches 145 in the bottom plate 33 were eliminated it would give rise to increased D.C. flux in the gap 34 at the expense of slight distortion in the signal induced in the section 44 of the armature. If the resultant distortion in the wave shape of the output can be tolerated, the lack of symmetry will enable the exciter to develop greater output force.

The invention has been described with reference to two presently preferred embodiments thereof. However, it will be apparent to those skilled in the art that numerous changes can be made in the construction thereof without departing from the true spirit of the invention as defined in the appended claims.

What is claimed is:

1. An electrodynamic exciter comprising a stator field core structure of ferrous material having a substantially completely enclosed annular cavity therein so as to provide radially inner and outer pole members with an annular gap therebetween and substantially symmetrical low reluctance flux paths of ferrous material around both ends of the gap, means for establishing a unidirectional magnetic field between said pole members across said gap, openings in said core structure providing communication between said gap and the exterior of said core structure, an armature supported for movement in said openings relative to said core structure and having a closed loop of electrically conductive material of at least one turn disposed concentrically in said gap, means for inducing an alternating electric current in said loop of material, said last-mentioned means including a stationary winding inductively coupled to said loop of material and means for coupling said stationary winding to a source of alternating signal current, said armature comprising a spider-like supporting structure having a plurality of flat plates joined along one vertical edge along a central axis and radiating therefrom at intervals thereabout, and a hollow cylindrical section of electrically conductive material constituting said closed loop, said cylindrical section being joined at one of its ends co-axially to an end of said supporting structure.

2. An electrodynamic exciter according to claim 1, wherein said cylindrical section of the armature is provided with a plurality of fluid passages, and said passages are coupled to a system of headers in the form of metal tubing secured to the ends of said cylindrical section and to said flat plates of the supporting structure, said tubing extending to a point near the end of said supporting structure remote from said cylindrical section, whereby cooling fluid can be circulated through said passages.

References Cited

UNITED STATES PATENTS

| | | | |
|---|---|---|---|
| 2,846,598 | 8/1958 | Zerigian | 310—27 |
| 2,925,503 | 2/1960 | Efromson | 310—27 |
| 3,075,100 | 1/1963 | Efromson | 310—27 |
| 2,118,862 | 5/1938 | Rayment et al. | 310—27 |
| 2,820,161 | 1/1958 | Lewis | 310—27 |
| 3,049,913 | 8/1962 | Hunt | 310—16 X |
| 3,161,793 | 12/1964 | Laithwaite | 310—27 |

J. D. MILLER, *Primary Examiner.*

D. F. DUGGAN, *Assistant Examiner.*

U.S. Cl. X.R.

310—27